United States Patent [19]

Yoshino

[11] 4,097,880

[45] Jun. 27, 1978

[54] PHOTOGRAPHIC STROBOSCOPE

[75] Inventor: Tsunemi Yoshino, Ibaraki, Japan

[73] Assignee: West Electric Co., Ltd., Osaka, Japan

[21] Appl. No.: 809,091

[22] Filed: Jun. 23, 1977

[30] Foreign Application Priority Data

Jun. 30, 1976 Japan .................................. 51-78322
Jul. 2, 1976 Japan .................................. 51-79238

[51] Int. Cl.[2] ........................ G03B 15/03; H05B 41/18
[52] U.S. Cl. ................................ 354/145; 315/241 P
[58] Field of Search .................................. 354/32–35, 354/60 F, 139, 145, 149; 315/241 P, DIG. 7

[56] References Cited

U.S. PATENT DOCUMENTS 3,976,914 8/1976 McConnell ...................... 354/145 X
4,062,027 12/1977 Miyazaki et al. .................. 354/35 X

*Primary Examiner*—L. T. Hix
*Assistant Examiner*—William B. Perkey
*Attorney, Agent, or Firm*—Burgess, Ryan and Wayne

[57] ABSTRACT

A stroboscope for a camera wherein the energy stored on a main capacitor is converted by a flash lamp into a flash of light. It is provided with a flash delay means for maintaining constant a time delay elapsing from the time the stroboscope receives a flash command signal from the camera to the time the flash lamp flashes irrespective of the magnitude of the voltage charged across the main capacitor, whereby a stroboscopic circuitry may be considerably simplified.

6 Claims, 3 Drawing Figures

PHOTOGRAPHIC STROBOSCOPE

BACKGROUND OF THE INVENTION

The present invention relates to a photographic stroboscope provided with a flash delay means for maintaining a time delay elapsing from the time a flash command signal is received to the time a flash lamp flashes constant.

Recently flat, small-sized and portable pocket size cameras have been widely used, and in conjunction with these cameras a variety of attachments for flash exposure have been devised and demonstrated. In one flash attachment, a plurality of small-sized flashlamps encased in a housing are triggered to flash one by one, and in another attachment a stroboscope is used wherein the energy stored on the main capacitor is converted by the flash lamp into a flash of light.

In general, with these cameras a flash command signal is created concurrently of the opening of a shutter and is applied to a flash attachment so that the triggering and flashing operation of the flash attachment must be precisely synchronized with the camera shutter operation. With the flashlamps, the flash waveform is of M class, it requires about 15 ms to reach the peak, and the flash duration is approximately 20 ms. Therefore even when the flashlamp is triggered concurrently of the opening of the camera shutter, the flashing operation may be sufficiently synchronized with the shutter operation. However, with the stroboscope the peak is reached immediately and the flash duration is about one millisecond. Therefore when the flash lamp in the stroboscope is triggered concurrently of the opening of the camera shutter, the flash operation cannot be made in synchronism with the shutter operation so that an underexposure results.

SUMMARY OF THE INVENTION

One of the objects of the present invention is therefore to provide a photographic stroboscope provided with flash delay means adapted to maintaining a time delay elapsing from the time a flash command signal is received to the time a flash lamp flashes constant without the use of a reference voltage source.

To the above and other ends, the present invention provides a photographic stroboscope comprising a main capacitor, a flash lamp for converting the energy stored on the main capacitor into a flash of light, a trigger circuit comprising a trigger capacitor, a trigger or step-up transformer, and a thyristor; a first switching means adapted to be enabled in response to a flash command signal; a second switching means adapted to reverse its output each time when said first switching means is enabled or disabled; and a delay circuit interconnected between the gate of the thyristor and the output of the second switching means for reverse biasing the gate of the thyristor with respect to the cathode thereof when the first switching means is enabled and for forward biasing the gate of the thyristor with respect to the cathode thereof when the first switching means is disabled, thereby enabling the thyristor.

BRIEF DESCRIPTION OF THE DRAWINGS

Same reference numerals are used to designate similar parts throughout the figures.

DESCRIPTION OF THE PREFERRED EMBODIMENTS

PRIOR ART, FIG. 1

Figure 1:
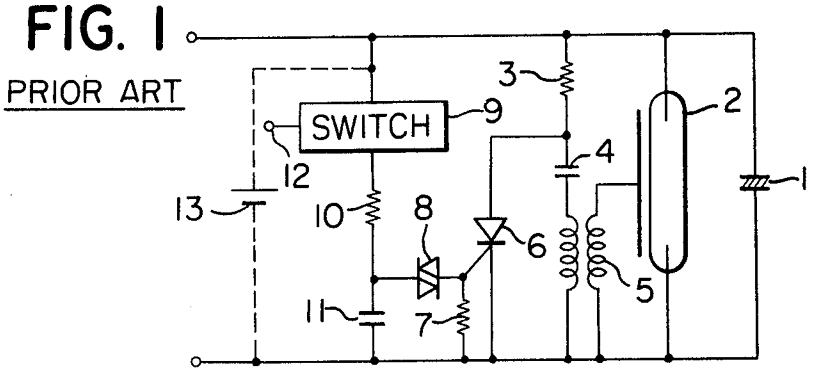
FIG. 1 PRIOR ART
FIG. 1 is a circuit diagram of a prior art stroboscope provided with a flash delay means.

Prior to the description of the preferred embodiments of the photographic stroboscope in accordance with the present invention, a typical prior art stroboscope provided with a flash delaying means will be briefly described with reference to FIG. 1. In response to the flash signal from a camera (not shown) applied to a terminal 12, an electronic or mechanical switch 9 is enabled so that the charging of a capacitor 11 is started and the voltage across the capacitor 11 increases depending on a time constant which is determined by the values of a resistor 10 and the capacitor 11. When the voltage across the capacitor 11 increases and reaches an inherent conduction voltage of a trigger element 8 such as a Diac, zener diode, neon bulb or the like, the discharging current from the capacitor 11 flows into the gate of a thyristor 6 to enable the same so that the energy which has been stored on a trigger capacitor 4 through a resistor 3 is liberated and consequently a flash lamp 2 flashes by a high-voltage pulse induced across a secondary of a trigger transformer 5.

A time delay T elapsing from the time the signal from the camera is applied to the terminal 12 to the time the flash lamp 2 flashes is dependent upon a time required for the capacitor 11 to charge the voltage thereacross equal to the conduction voltage of the trigger element 8. That is, the conduction voltage E of the trigger element 8 is given by $$E = V(1 - \epsilon^{\frac{1}{CR}T}) \qquad (1)$$

where $V$ = a voltage charged across a main capacitor 1,
$C$ = a capacitance of the capacitor 11, and
$R$ = a value of the resistor 10.

Rewritting Eq. (1) in terms of $T$ yields $$T = -CRl_n(1 - E/V) \qquad (2)$$

Since $C$, $R$ and $E$ are constants, the time delay $T$ is solely dependent on the voltage charged across the main capacitor 1. Therefore, in order to render the time delay constant irrespective of the variation in the voltage charged across the main capacitor 1, a reference voltage source 13 must be provided which is free from the influence of the voltage charged across the main capacitor 1. As a result, the prior art stroboscope is much complicated in circuit design and accordingly is expensive. In addition, during the assembly a floating capacitance is invelved between the terminal and the gate of the thyristor 6 so that in response to the impression of the command signal on the terminal 12 the thyristor 6 is caused to be enabled before a predetermined time delay has been elasped due to this floating capacitance and consequently the "mis-flashing" results.

FIRST EMBODIMENT, FIG. 2

The first embodiment of a photographic stroboscope in accordance with the present invention includes a flash delay means generally indicated by the reference numeral 23 and comprised of a terminal 14 to which is applied a command signal from a camera (not shown), a differentiating circuit consisting of a capacitor 16 and a resistor 17, a first switching circuit consisting of a resistor 15 and a semiconductor switching element 18 such as a transistor, a second switching circuit consisting of a NOT gate 19 and a NAND gate 20, a capacitor 21 and a variable resistor 22. The differentiating circuit and the first switching circuit comprise a first switching means.

The input to NOT gate 19 is maintained at a low level until the command signal is applied to the terminal 14 so that the output of NOT gate 19 is maintained at a high level. The transistor 18 is disabled so that its collector output is at a high level and the output from NAND gate 20 is at a low level. As a result, the capacitor 21 is not charged.

Figure 2:
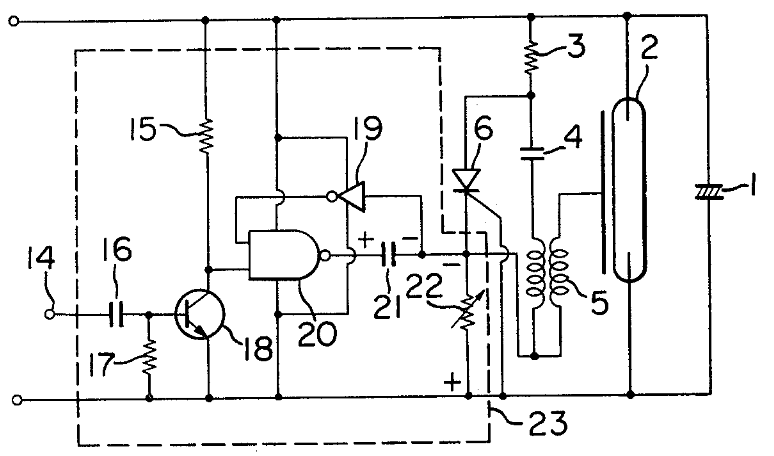
FIGS. 2 and 3 are circuit diagrams of first and second embodiments, respectively, of a photographic stroboscope provided with a flash delay circuit in accordance with the present invention.
Figure 3:
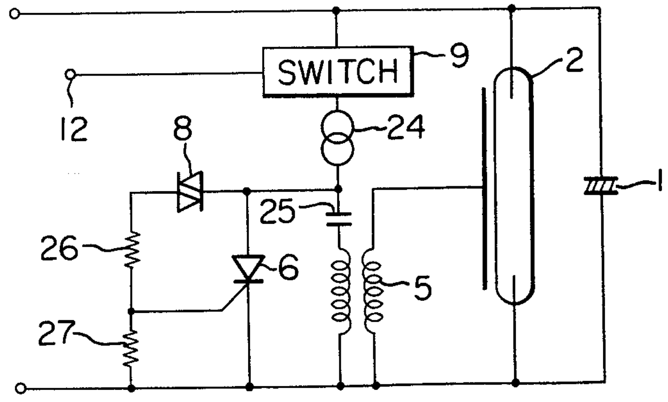

When the command signal is applied to the terminal 14, it is applied, after being differentiated by the differentiating circuit consisting of the capacitor 16 and the resistor 17, to the base of the transistor 18 to enable it so that the collector output drops to a low level and the output of NAND gate 20 rises to a high level. As a consequence, the charging current flows through NAND gate 20 and the variable resistor 22 to the capacitor 21 so that the latter is charged with the polarities shown. The voltage across the variable resistor 22 causes the gate of the thyristor 6 to reverse biase with respect to the cathode of the thyristor 6 so that the latter is not enabled. The command signal is applied to the terminal 14 only for a very short time so that the transistor which has been enabled as described above is soon disabled to interrupt the current flowing through the variable resistor 22. Then the output of NOT gate 19 rises again to a high level so that the output of NAND gate 20 drops again to a low level so that the energy stored on the capacitor 21 is discharged through the variable resistor 22. In this case, the voltage across the variable resistor 22 has the polarities shown in FIG. 2 so that the thyristor 6 is forward biased and is enabled and consequently the flash lamp 2 flashes.

The value of the variable resistor 22 determines both the charging and discharging time of the capacitor 21 and therefore the time delay T; that is, the time interval elapsing from the time the command signal is applied to the terminal 14 to the time the flash lamp 2 flashes. That is, the delay time T is given by $$T = -CRl_n(1 - V'/V) \qquad (3)$$

Where
C = a capacitance of the capacitor 21,
R = a value of the resistor 22,
V' = a threshold voltage applied to the input of the NOT gate 19, and
V = a source voltage applied to the NOT gate 19.

In general, the threshold voltage V' is approximately $\frac{1}{2}$ of the source voltage V. Therefore, substituting $V' = \frac{1}{2}V$ into Eq. (3), we have $$T = -CRl_n\left(1 - \frac{\frac{1}{2}V}{V}\right) = -CRl_n\frac{1}{2} \qquad (4)$$

Thus the time delay T is solely dependent on the capacitance of the capacitor 21 and the value of the variable resistor 22.

As described above, in the photographic stroboscope in accordance with the present invention, the time delay T; that is, the time interval elapsing from the time the command signal is applied to the terminal 14 to the time the flash lamp flashes is solely determined by the time constant of the capacitor 21 and the variable resistor 22 so that the time delay T may be maintained constant in a stable manner without the provision of a reference voltage circuit. Furthermore, the gate of the thyristor 6 is reverse biased from the time the command signal is applied to the time the thyristor, which is a switching element in a trigger circuit, so that an erratic operation; that is, the conduction of the thyristor immediately after the application of the command signal to the terminal 14 may be avoided.

SECOND EMBODIMENT, FIG. 3

In the second embodiment of a photographic stroboscope in accordance with the present invention, in response to the application of the command signal to the terminal 12, the mechanical or electronic switching circuit 9 is closed so that a trigger capacitor 25 is charged through a constant current circuit 24. When the voltage across the trigger capacitor 25 reaches the conduction voltage of the trigger element 8, the latter is enabled so that the current discharged from the trigger capacitor 25 flows into the gate of the thyristor 6 to enable it to conduct. As a result, the energy stored on the trigger capacitor 25 is discharged through a primary of a trigger or step-up transformer 5 so that a high-voltage pulse induced across the secondary of the trigger transformer 5 causes the flash lamp 2 to flash.

The time delay T as defined in the second embodiment as the time interval elapsing from the time the command signal is applied to the terminal 12 to the time the flash lamps 2 flashes is dependent upon the time required for the voltage charged across the trigger capacitor 25 to reach the conduction voltage of the trigger element 8, and is given by $$T = EC/I \qquad (5)$$

where
$E$ = a conduction voltage of the trigger element 8,
$C$ = a capacitance of the capacitor 25, and
$I$ = an output current from the constant current circuit 24.

All of E, C and I are constants so that the time delay T is not affected by the voltage V charged across the main capacitor 1 and consequently a constant voltage source may be eliminated from the delay circuit. The delay time T may be varied by varing the output current I from the constant current circuit 24 so that the photographic stroboscopes in accordance with the present invention may be advantageously applied to a variety of pocket type cameras in which a time interval from the time a flash command signal is applied to the time the shutter is wide opened is different from each other.

What is claimed is:

1. A photographic stroboscope comprising
(a) a main capacitor;
(b) a flash lamp for converting the energy stored on said main capacitor into a flash of light;
(c) a trigger circuit comprising a trigger capacitor, a trigger transformer and a thyristor;
(d) first switching means adapted to be caused to conduct in response to a flash command signal applied thereto;

(e) second switching means responsive to the conduction of said first switching means for reversing its output level and for reversing its output level again to an initial level after said first switching means has been disabled; and (f) a time delay circuit interconnected between the gate of said thyristor and the output of said second switching means for reverse biasing said gate of said thyristor with respect to the cathode thereof when said first switching means is enabled and for forward biasing said gate of said thyristor with respect to said cathode thereof when said first switching means is disabled, thereby causing said thyristor to conduct.

2. A photographic stroboscope as set forth in claim 1 wherein said first switching means comprises a differentiating circuit for differentiating the flash command signal, and a transistor so arranged as to be enabled in response to the output from said differentiating circuit.

3. A photographic stroboscope as set forth in claim 1 wherein said second switching means comprises a NOT gate having its input connected to the cathode of said thyristor, and a NAND gate with a first input electrically connected to the output of said NOT gate and a second input electrically connected to the output of said first switching means.

4. A photographic stroboscope as set forth in claim 1 wherein said time delay circuit comprises a resistor electrically interconnected between the gate and cathode of said thyristor, and a capacitor adapted to be charged through said resistor and said second switching means.

5. A photographic stroboscope as set forth in claim 4 wherein said resistor is a variable resistor.

6. A photographic stroboscope comprising (a) a main capacitor, (b) a flash lamp for converting the energy stored on said main capacitor into a flash of light;

(c) a trigger circuit comprising a trigger transformer with a primary coil and a secondary coil, a trigger capacitor, and a switching element with a control electrode for causing, when conducted, the discharge of the energy stored on said trigger capacitor through said primary coil of said trigger transformer;

(d) a switching circuit adapted to be enabled in response to a flash command signal, (e) a constant current circuit operable in response to the conduction of said switching circuit for charging said trigger capacitor; and (f) a voltage application circuit with a trigger element adapted to be enabled when the voltage charged across said trigger capacitor reaches a predetermined level so that a voltage is applied to said control electrode of said switching element, thereby enabling the same.

* * * * *

UNITED STATES PATENT OFFICE
CERTIFICATE OF CORRECTION

Patent No 4,097,880 Dated June 27, 1978

Inventor(s) Tsunemi Yoshino

It is certified that error appears in the above-identified patent and that said Letters Patent are hereby corrected as shown below:

Column 2, line 45: Change "Rewritting" to --Rewriting--.

Column 3, line 28: Change "biase" to --bias--.

Column 4, line 52: Change "varing" to --varying--.

Signed and Sealed this

*Eighth* Day of *May 1979*

[SEAL]

*Attest:*

RUTH C. MASON
*Attesting Officer*

DONALD W. BANNER
*Commissioner of Patents and Trademarks*